United States Patent [19]

Haneda

[11] Patent Number: 5,461,222
[45] Date of Patent: Oct. 24, 1995

[54] MEMORY CARD

[75] Inventor: Isamu Haneda, Soraku, Japan

[73] Assignee: Sharp Kabushiki Kaisha, Japan

[21] Appl. No.: 888,848

[22] Filed: May 27, 1992

[30] Foreign Application Priority Data

May 28, 1991 [JP] Japan .................... 3-123345

[51] Int. Cl.$^6$ ................................. G06K 19/06
[52] U.S. Cl. ................... 235/492; 235/375; 235/487
[58] Field of Search ..................... 235/487, 492, 235/375

[56] References Cited

U.S. PATENT DOCUMENTS

| | | |
|---|---|---|
| 3,971,925 | 7/1976 | Wenninger et al. . |
| 4,931,929 | 6/1990 | Sherman .................... 235/375 |
| 4,977,310 | 12/1990 | Studer ........................ 235/375 |
| 5,018,072 | 5/1991 | Ibamoto ..................... 235/375 |
| 5,038,273 | 8/1991 | Ito ............................... 235/375 |
| 5,159,180 | 10/1992 | Feiler ......................... 235/375 |

FOREIGN PATENT DOCUMENTS

| | | |
|---|---|---|
| 52-115627 | 9/1977 | Japan . |
| 53-35449 | 4/1978 | Japan . |
| 59-68072 | 4/1984 | Japan . |
| 59-123986 | 7/1984 | Japan . |
| 60-51242 | 4/1985 | Japan . |
| 61-168427 | 10/1986 | Japan . |
| 2-14740 | 4/1990 | Japan . |
| 3-9488 | 2/1991 | Japan . |
| 3-73374 | 3/1991 | Japan . |

OTHER PUBLICATIONS

Ser. No. 07/736,318 Onishi et al. (filed Jul. 29, 1991).

*Primary Examiner*—Harold Pitts
*Attorney, Agent, or Firm*—Nixon & Vanderhye

[57] ABSTRACT

A memory card on which a key symbol is printed is provided, which comprises a first memory for storing an image pattern corresponding to the key symbol and output for selectively outputting the image pattern from the first memory in accordance with an input system of a memory card terminal in which the memory card is set.

14 Claims, 3 Drawing Sheets

MEMORY CARD

BACKGROUND OF THE INVENTION

1. Field of the Invention

The present invention relates to a memory card set in a small-sized information terminal, and more particularly to a memory card which can be applied to various types of small-sized information/terminals such as an electronic pocketbook.

2. Description of the Prior Art

There are electronic pocketbooks in which a memory card can be set so as to increase its functions. This kind of electronic pocketbook has a system structure in which various kinds of functions can be performed by using an application program stored in a ROM mounted in the memory card.

Depending on the kind of electronic pocketbooks, there are two structures in which a transparent touch panel is provided and a memory card can be set under the transparent touch panel and in which a transparent touch panel is attached to the surface of a display section made of a liquid crystal graphic display panel. In the case of the former structure, a memory card, of which a key matrix corresponding to the application program stored in the ROM is printed on the surface, is used, and when an operator touches a specific key on the key matrix via the transparent touch panel, the corresponding application program starts to function. In the case of the latter structure, keys or icons corresponding to the application program are displayed on the display section, and when an operator touches the keys or icons via the transparent touch panel, the corresponding application program starts to function.

However, according to the above-mentioned structures, it is required that a memory card be in accordance with the type of an electronic pocketbook is selected, limiting the improvement in general-purpose properties of the electronic pocketbook and memory card.

SUMMARY OF THE INVENTION

The memory card on which a key symbol is printed of this invention, comprises first memory means for storing an image pattern corresponding to the key symbol and output means for selectively outputting the image pattern from the first memory means in accordance with an input system of a memory card terminal in which a memory card is set.

According to the above-mentioned structure, in the case that the memory card of the present invention is applied to the information terminal in which the memory card is set under the transparent touch panel, an operator can visually recognize the key matrix printed on the surface of the memory card through the transparent touch panel. Thus, when the operator touches a specific key on the key matrix via the transparent touch panel, the corresponding application program starts to function. In the case that the memory card of the present invention is applied to the information terminal in which the transparent touch panel is attached to the display section, when an image pattern stored in the ROM is read out to be displayed on the display section, an operator can visually recognize the image pattern corresponding to the key matrix through the transparent touch panel. Thus, when the operator touches the portion corresponding to the image pattern via the transparent touch panel, the corresponding application program starts to function.

Thus, the invention described herein makes possible the objective of providing a memory card which can be applied to various kinds of information terminals and which can improve general-purpose properties thereof.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Example

The present invention will be described by way of illustrating an example.

Figure 2:
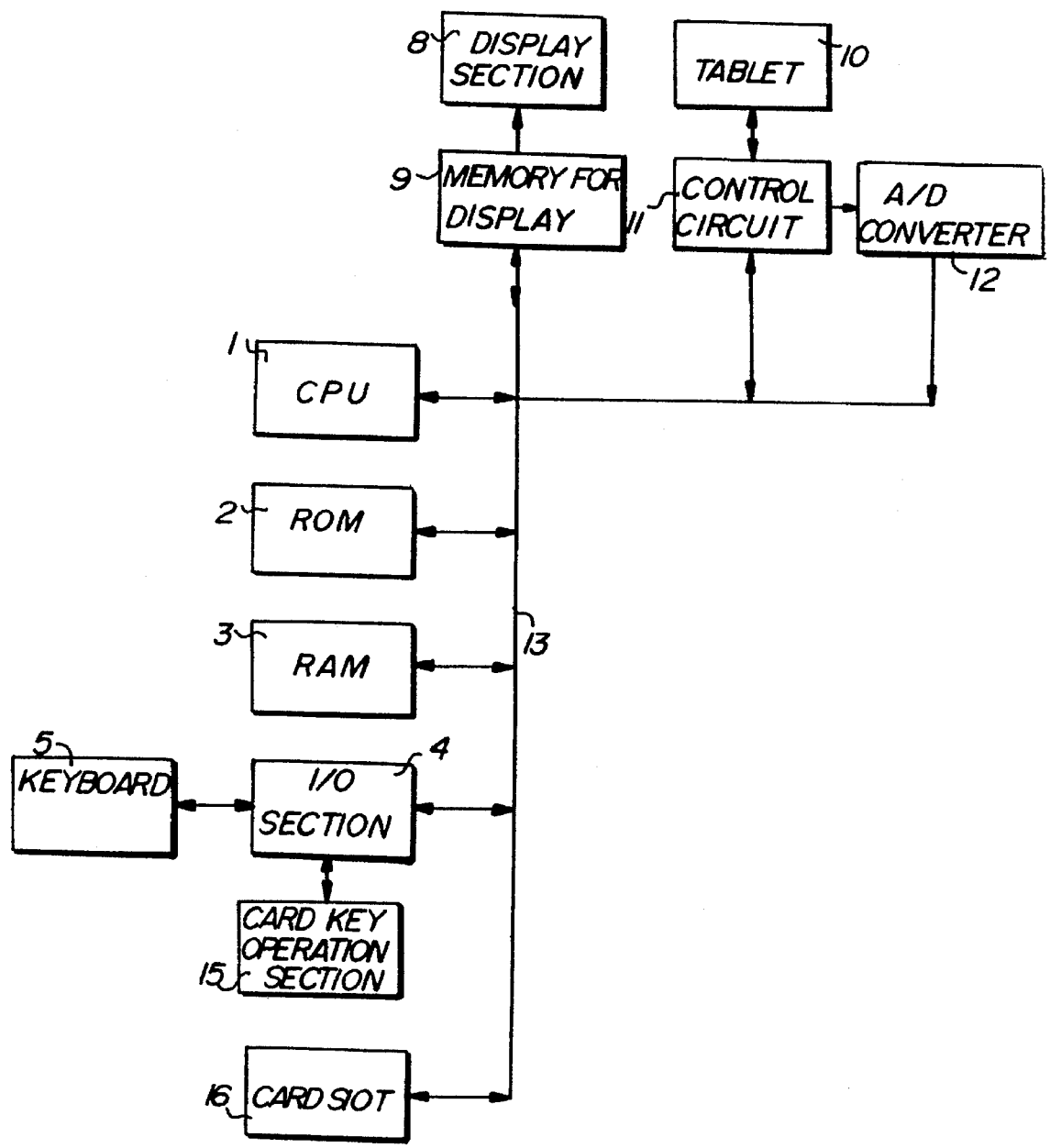
FIG. 2 is a block diagram showing a structure of an electronic pocketbook system.

FIG. 2 shows a structure of an electronic pocket book system in which a memory card of the present invention is set. A CPU 1 is the control center of the electronic pocketbook and controls various kinds of operations in accordance with a control program stored in a ROM 2.

The CPU 1 performs the above-mentioned control in accordance with the key input of an operator. The key input is performed via a key board 5. When the operator presses a key on the key board 5, the data corresponding to the key is transmitted to the CPU 1 via an I/O section 4 which is an input/output control section. The I/O section 4 also transmits the data corresponding to a specific key on a key matrix printed on the surface of a memory card 20 that will be described later. This key matrix has key symbols arranged in a matrix. The key symbols are used for selecting an application program and respectively correspond to the application programs. This kind of I/O section 4 is realized by an IC for an interface.

The data and the like transmitted to the CPU 1 by the key input of the operator is written in a RAM 3. The data written in the RAM 3 is displayed on a display section 8 following a command from the CPU 1. When a display mode of the data is selected by the key input, the CPU 1 reads the data stored in the RAM 3 and writes the data in a memory for display 9. Then, the data (image data) written in the memory for display 9 is displayed in the display section 8. The display section 8 is comprised by, for example, by a liquid crystal graphic display panel. The RAM 3 is also used as a stack area and a work area of the CPU 1.

A tablet 10 is attached to the display section 8 so as to cover it. The tablet 10 consists of a touch panel using a transparent analog resistance film, whereby the display data of the display section 8 can be visually recognized through the tablet 10. The tablet 10 is connected to a control circuit 11 controlling the voltage applied to the tablet 10. The control circuit 11 is connected to an A/D converter 12. When the operator touches the tablet 10, the A/D converter 12 converts positional data (amount of analog) into digital positional data and transmits it to the CPU 1. Because of this, the CPU 1 can recognize the display position of the display section 8, which corresponds to a position of the tablet 10 which the operator touches. Transference of signals between the CPU 1 and various kinds of devices such as the RAM 3 and the memory for display 9 is performed via a system bus 13.

Figure 3:
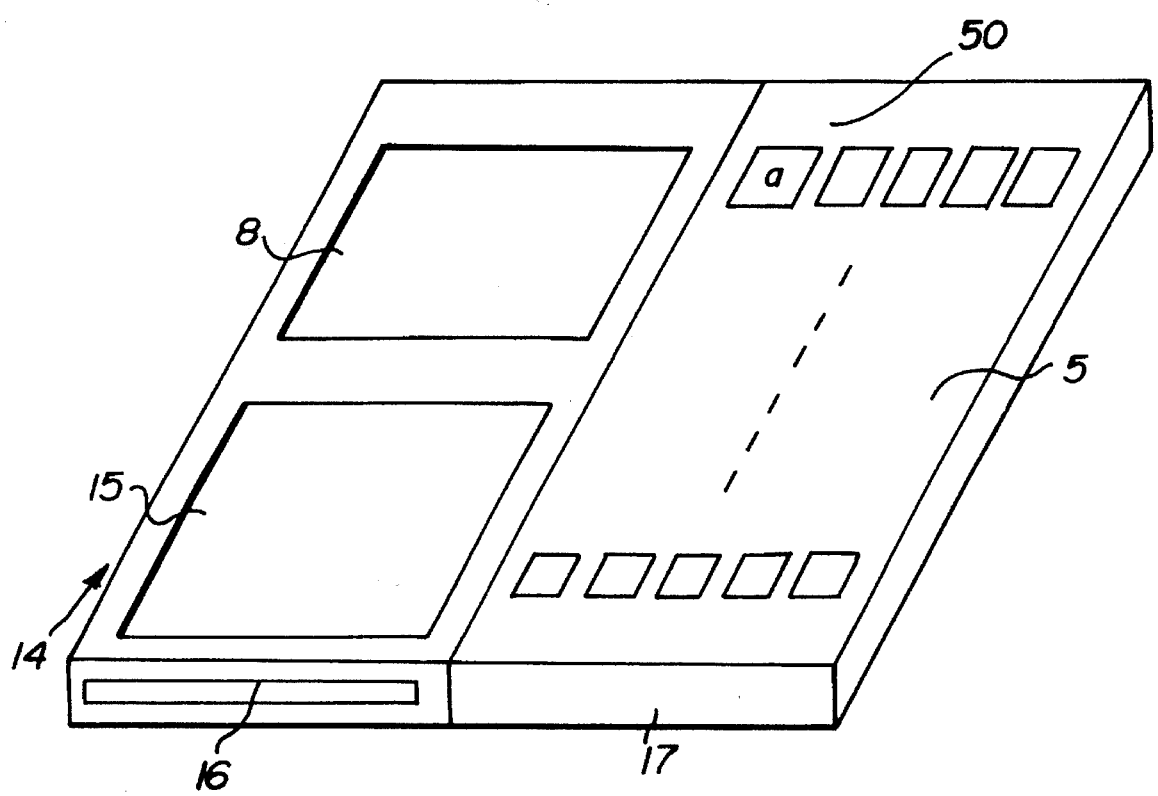
FIG. 3 is a perspective view showing the external appearance of the electronic pocketbook.

FIG. 3 shows an external appearance of the electronic pocketbook, and the key board 5 is provided on an inner face of a cover 17. Cover 17 is connected to an electronic pocketbook body 14 so that it can be opened or closed. On the other hand, on the surface of the electronic pocketbook body 14, a card key operation section 15 made of a transparent touch panel and the display section 8 are provided from the front side in this order. Moreover, a card slot 16 in which the memory card 20 is set is opened on the front face of the electronic pocketbook body 14.

Figure 1:
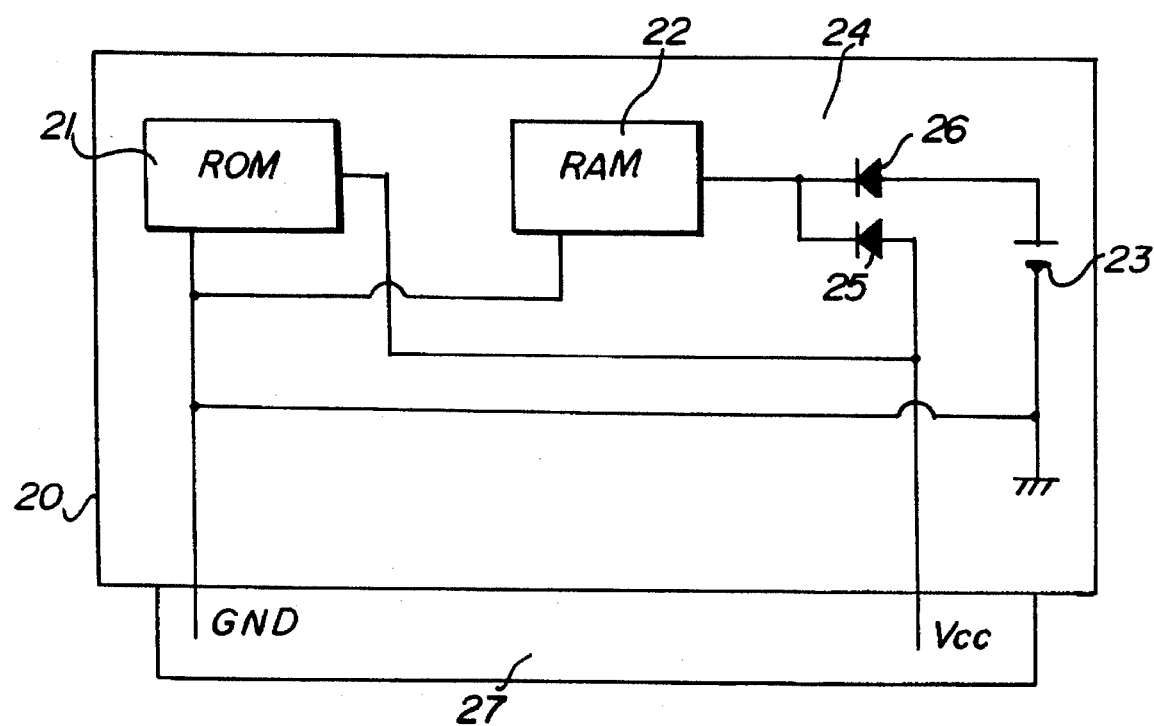
FIG. 1 is a diagram showing a memory card of the present invention.

When the memory card 20 shown in FIG. 1 is set in the electronic pocketbook body 14 through the card slot 16, since the key matrix (not shown) printed on the surface of the memory card 20 can visually be recognized through the card key operation section 15, the operator can select a specific key on the key matrix by touching the corresponding region of the card key operation section 15. When the specific key on the key matrix is selected, the selected data is transmitted to the CPU 1 via the I/O section 4 as shown in FIG. 2. The key matrix corresponds to the application program stored in the ROM 21 of the memory card 20. Thus, when the specific key is selected, the corresponding application program is selected. This ROM 21 can be one ROM or a plurality of ROMs.

FIG. 1 shows the memory card of the present invention in detail. The memory card 20 comprises the ROM 21 and the RAM 22, and the application program is stored in the ROM 21. Image patterns for displaying the key corresponding to the application program on the display section 8 are stored in the ROM 21. The application program and the image pattern can be stored in one ROM or respectively stored in ROMs separately. On the other hand, the work area is provided in the RAM 22. Data required at the time when the application program of the ROM 21 is executed is stored in the work area. The RAM 22 is connected to a battery 23 for backup which prevents the stored data from disappearing. When the application program in the memory card 20 does not require the RAM 22, the RAM 22 and battery 23 are not necessary.

When the memory card 20 is set in the electronic pocketbook body 14 through the card slot 16, a power source voltage Vcc is supplied from a power source of the electronic pocketbook body 14 to the ROM 21 and the RAM 22, and the ROM 21 and the RAM 22 will then operate. On the other hand, when the memory card 20 is pulled out of the electronic pocketbook body 14, a voltage is applied from the battery 23 to the ROM 21 and the RAM 22. This switching is performed by a switching circuit 24 made of diodes 25 and 26.

When the memory card 20 is set in the electronic pocketbook body 14, a connector 27 provided at one end of the memory card 20 is connected to a memory card I/F provided in the card slot 16. Because of this, as shown in FIG. 2, the CPU 1 can gain access to the ROM 21 and the RAM 22 via the card slot 16.

The execution of the application program in the ROM 21 is performed as follows. When the memory card 20 is set in the electronic pocketbook body 14, and the operator presses "a" key 50 on the key board 5 shown in FIG. 3, the CPU 1 recognizes this key input by the data inputted through the I/O section 4, finishes the processing of the control program stored in the ROM 2 which has been in execution, and executes the control program corresponding to the application program in the ROM 21 mounted in the memory card 20. Such an operating procedure of the CPU 1 is stored in the ROM 2 as the control program of the electronic pocketbook system.

When the control is delivered to the execution of the program stored in the ROM 21 mounted in the memory card 20, the type of the connected electronic pocketbook is discriminated due to the execution of the program stored in the ROM 21. These are the following three types of electronic pocketbooks.

Type (1): an electronic pocketbook which has the card key operation section 15 and does not have the tablet 10.

Type (2): an electronic pocketbook which does not have the card key operation section 15 but has the tablet 10.

Type (3): an electronic pocketbook which has both the card key operation section 15 and the tablet 10.

This discriminating operation is performed as follows: data for discrimination which shows the type of the electronic pocketbook is written in the ROM 2, and when the CPU 1 executes the control program stored in the ROM 21, the CPU 1 performs the discriminating process by reading the data for discrimination from the ROM 2.

When the CPU 1 discriminates the type of the electronic pocketbook due to this discriminating process, the application program is executed as follows: i.e., when the electronic pocketbook is Type (1), the operator performs a key input by pressing the key on the key board 5, and visually recognizes the key matrix printed on the surface of the memory card 20 through the card key operation section 15, thereby selecting the corresponding key. Due to the key input from both key board 5 and the key matrix, the corresponding application program is executed.

Moreover, when the electronic pocketbook is either Type (2) or (3), an image pattern corresponding to the key matrix stored in the ROM 21, more specifically an image pattern of the key corresponding to each application program is displayed on the display section 8, and the operator who visually recognizes this pattern selects the key input by touching the tablet 10, whereby the application program corresponding to the selected key input is executed.

As described above, according to a structure in which the key matrix corresponding to the application program is printed on the surface of the memory card 20 and the image pattern corresponding to the key matrix is stored in the ROM 21, the memory card 20 can be used in the above-mentioned three types of electronic pocketbooks. Thus, even when the user would like to change the electronic pocketbook of Type (1) to that of Type (2), there is an advantage in that the original memory card 20 for the electronic pocketbook of Type (1) can be used for that of Type (2).

In the case of the electronic pocketbook of Type (2), it is required that the display section 8 has a display region enough for displaying the image pattern and the original display contents. In this case, according to the display mode in which the image pattern is reduced to be displayed, the occupied area of the display section 8 is decreased, so that it is convenient for miniaturizing the device structure.

In addition, there is a fundamental routine for performing input/output control in the ROM 2 of the electronic pocketbook. This fundamental routine includes a routine for input from the key board 5, the card key operation section 15, and the tablet 10. The application programs in the ROM 2 and the ROM 21 are programs using this fundamental routine, and in these application programs, the process for directly reading the key input of the card key operation section 15 is not performed.

Thus, even though the process routine for the key input from the card key operation section 15 is called at the entrance of the fundamental routine of the electronic pocketbook of Type (2), in this case, since the card key operation section 15 is not provided and the key input is performed from the tablet 10, the key input process from the card key operation section 15 can be replaced by the input process from the tablet 10. This means that even though the input mode is different, the memory card can be used in common for any type of electronic pocketbook without any trouble.

In the above-mentioned example, the case in which the memory card of the present invention is applied to the electronic pocketbook is described. However, as to other memory card terminals, the memory card can be applied in the same way.

According to the present invention, the key matrix corresponding to the application program stored in the ROM is printed on the surface of the memory card, and the image pattern corresponding to the key matrix is stored in the ROM, whereby the image pattern is displayed on the display section of the small-sized information terminal in accordance with the key matrix, if required. Thus, in the small-sized information terminal equipped with the card key operation section, the operator selects the printed key matrix and executes the corresponding application program. In addition, in the small-sized information terminal equipped with the display section and the tablet covering the display section, the image pattern stored in the ROM is displayed on the display section, and when the user selects the display key through the tablet, the corresponding application program is executed.

As described above, according to the memory card of the present invention, one card can be used in a plurality kinds of small-sized information terminals. Thus, the general-purpose properties of the small-sized information terminal and the memory card can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A memory card on which a key symbol is printed, comprising:

first memory means for storing an image pattern corresponding to key symbols and a program for discriminating a type of a pocketbook-sized information terminal in which the memory card is set; and output means for selectively outputting the image pattern from the first memory means in accordance with an input system of said terminal.

2. A memory card according to claim 1, further comprising second memory means for storing at least one application program.

3. A memory card according to claim 2, wherein the key symbol is a key matrix corresponding to the application programs.

4. A memory card according to claim 3, wherein a plurality of application programs are stored in the second memory means and each application program respectively corresponds to each key of the key matrix.

5. A memory card according to claim 3, wherein the image pattern stored in the first memory means is the key matrix.

6. A memory card according to claim 2, further comprising a battery for applying a power source voltage to the first and second memory means.

7. A memory card according to claim 1, wherein the first memory means has a ROM.

8. A memory card according to claim 1, wherein the first memory means has a RAM.

9. A memory card according to claim 2, wherein the second memory means has a ROM.

10. A memory card according to claim 2, wherein the second memory means has a RAM.

11. A display-discriminating memory card for insertion into a pocketbook-sized information terminal, the memory card having key symbols externally visible thereon, the memory card comprising a memory having stored therein instructions for generating signals for determining information display capabilities of the terminal and for generating signals for displaying the key symbols on an appropriate one(s) of a potential plurality of display devices of the terminal in accordance with the determined information display capabilities of the terminal.

12. The apparatus of claim 11, wherein the memory card is insertable under a transparent element of the terminal.

13. The apparatus of claim 12, wherein the key symbol is a key matrix.

14. The apparatus of claim 11, wherein the memory card has a first memory wherein instructions for generating signals for displaying user-interactive key symbols are stored and a second memory wherein are stored an applications program executable by the CPU of the terminal.

* * * * *